(12) United States Patent
Li et al.

(10) Patent No.: US 11,227,178 B2
(45) Date of Patent: Jan. 18, 2022

(54) BACK-PROPAGATION IMAGE VISUAL SALIENCY DETECTION METHOD BASED ON DEPTH IMAGE MINING

(71) Applicant: Peking University Shenzhen Graduate School, Shenzhen (CN)

(72) Inventors: Ge Li, Shenzhen (CN); Chunbiao Zhu, Shenzhen (CN); Wenmin Wang, Shenzhen (CN); Ronggang Wang, Shenzhen (CN); Tiejun Huang, Cheney (CN); Wen Gao, Guangdong (CN)

(73) Assignee: Peking University Shenzhen Graduate School

( * ) Notice: Subject to any disclaimer, the term of this patent is extended or adjusted under 35 U.S.C. 154(b) by 382 days.

(21) Appl. No.: 16/336,737

(22) PCT Filed: Nov. 24, 2017

(86) PCT No.: PCT/CN2017/112788
§ 371 (c)(1),
(2) Date: Mar. 26, 2019

(87) PCT Pub. No.: WO2019/000821
PCT Pub. Date: Jan. 3, 2019

(65) Prior Publication Data
US 2021/0287034 A1    Sep. 16, 2021

(30) Foreign Application Priority Data
Jun. 29, 2017 (CN) .......................... 201710513077.2

(51) Int. Cl.
G06K 9/46 (2006.01)
G06K 9/62 (2006.01)
(52) U.S. Cl.
CPC ......... G06K 9/4671 (2013.01); G06K 9/4652 (2013.01); G06K 9/6223 (2013.01)

(58) Field of Classification Search
CPC ... G06K 9/4671; G06K 9/6223; G06K 9/4652
See application file for complete search history.

(56) References Cited

U.S. PATENT DOCUMENTS 9,390,315 B1 * 7/2016 Yalniz .................. G06K 9/4609
2014/0378810 A1 * 12/2014 Davis .................. A61B 5/1034
600/407

FOREIGN PATENT DOCUMENTS

| CN | 105761238 A | * | 7/2016 |
| CN | 105787938 A | * | 7/2016 |
| CN | 1054787938 A | | 7/2016 |

OTHER PUBLICATIONS

Qin Y, Lu H, Xu Y, et al. Saliency detection via Celluar Automata, (2015), IEEE Conference on Computer Vision and Pattern Recognition. IEEE, 2015:110-119 (Year: 2015).*

(Continued)

Primary Examiner — Matthew C Bella
Assistant Examiner — Kathleen M Broughton
(74) Attorney, Agent, or Firm — The Belles Group, P.C.

(57) ABSTRACT

A back-propagation significance detection method based on depth map mining, comprising: for an input image $I_o$, at a preprocessing phase, obtaining a depth image $I_d$ and an image $C_b$ with four background corners removed of the image $I_o$; at a first processing phase, carrying out positioning detection on a significant region of the image by means of the obtained image $C_b$ with four background corners removed and the obtained depth image $I_d$ to obtain the preliminary detection result $S_1$ of a significant object in the image; then carrying out depth mining on a plurality of processing phases of the depth image $I_d$ to obtain corresponding significance detection results; and then optimizing the significance detection result mined in each processing phase by means of a back-propagation mechanism to obtain (Continued)

a final significance detection result map. The method can improve the detection accuracy of the significance object.

2 Claims, 2 Drawing Sheets

(56) References Cited

OTHER PUBLICATIONS

Written Opinion of the International Searching Authority, PCT/CN2017/112788 dated Feb. 8, 2018, pp. 1-4.

* cited by examiner

BACK-PROPAGATION IMAGE VISUAL SALIENCY DETECTION METHOD BASED ON DEPTH IMAGE MINING

CROSS-REFERENCE TO RELATED PATENT APPLICATIONS

The present application is a U.S. national stage application under 35 U.S.C. § 371 of PCT Application No. PCT/CN2017/112788, filed Nov. 24, 2017, which claims priority to Chinese Patent Application No. 201710513077.2, filed Jun. 29, 2017. The disclosures of the aforementioned priority applications are incorporated herein by reference in their entireties.

TECHNICAL FIELD

The present invention relates to the technical field of image processing, in particular to a multi-phase back-propagation image visual saliency detection algorithm for deep mining of a depth image.

BACKGROUND ART

In a complex scene, human would be quickly attracted to a few of salient visual objects and process these objects preferentially with eyes. This process is called visual saliency. The saliency detection is just to simulate human eyes to properly process images with a mathematical calculation method by using a visually biological mechanism of the human eyes, so as to obtain a salient object in one picture. Since we can preferentially distribute computing resources required by image analysis and synthesis through salient regions, it is significant to detect the salient regions of the images by calculation. The extracted salient images can be widely used in many computer vision fields, including image segmentation of target objects of interest, detection and recognition of the target objects, image compression and encoding, image retrieval, content-aware image editing and the like.

Generally, an existing saliency detection framework is mainly divided into: a from-bottom-to-top saliency detection method and a from-top-to-bottom saliency detection method. The data driving-based from-bottom-to-top saliency detection method is adopted mostly at the present and independent from specific tasks. The from-top-to-bottom saliency detection method is subjected to consciousness and associated with specific tasks.

In the existing methods, most of the from-bottom-to-top saliency detection methods use low-level characteristic information, such as color characteristics, distance characteristics and some heuristic saliency characteristics. Although these methods have their own advantages, they are not accurate and robust enough on challenging data sets in specific scenes. In order to solve this problem, with the advent of a 3D (3-dimensional) image acquisition technology, there are methods adopting depth information to enhance the accuracy of salient object detection at the present. The depth information can increase the accuracy of the salient object detection, but when one salient object has a low contrast with its background, the accuracy of the saliency detection will still be affected. On the whole, the existing image salient object detection methods have low accuracy during detection of the salient objects, are not robust enough and may easily cause error detection, missing detection and the like, and it is very hard to obtain an accurate image saliency detection result, resulting in false detection of a salient object body and also causing a certain error to an application using a saliency detection result.

SUMMARY OF THE INVENTION

The present invention is directed to provide a back-propagation saliency detection algorithm for deep mining of a depth image for the abovementioned shortcomings in the prior art, so as to solve the problems that existing saliency detection is not accurate and robust enough, allow a salient region in an image to be displayed more accurately and provide accurate and useful information for later applications such as target recognition and classification.

A technical solution provided by the present invention is:

A back-propagation saliency detection method based on depth image mining, including: at a preprocessing phase, obtaining a depth image of an image and an image with four background corners removed; at a first processing phase, carrying out positioning detection on a salient region of the image by means of color, depth and distance information to obtain a preliminary detection result of a salient object in the image; then carrying out deep mining on the depth image from a plurality of layers (processing phases) to obtain corresponding saliency detection results; and then optimizing the saliency detection result mined in each layer by means of a back-propagation mechanism to obtain a final saliency detection result image. The implementation of the method includes the following steps:

1) A preprocessing phase: for an input image $I_o$, firstly obtaining a depth image, defined as $I_d$, by means of Kinect equipment; and secondly, removing four background edges of the image by means of a BSCA algorithm, and defining the obtained image with the four background corners removed as $C_b$, wherein the BSCA algorithm is recorded in the document (Qin Y, Lu H, Xu Y, et al. Saliency detection via Celluar Automata [C]/IEEE Conference on Computer Vision and Pattern Recognition. IEEE, 2015:110-119, and is to obtain a background saliency map based on background seed information according to color and distance information comparison.

2) A first processing phase: carrying out preliminary saliency detection on the input image $I_o$ by means of the obtained image $C_b$ with the four background corners removed and the depth image $I_d$ to obtain a preliminary saliency monitoring result defined as: $S_1$; specifically including steps 11 to 15:

Step 11, dividing the image into K regions by means of a K-means algorithm, and calculating a color saliency value $S_c(r_k)$ of each subregion through the formula (1):

$$S_c(r_k) = \Sigma_{i=1, i \neq k}^{K} P_i W_s(r_k) D_c(r_k, r_i) \tag{1}$$

wherein $r_k$ and $r_i$ respectively represent regions k and i, $D_c(r_k, r_i)$ represents a Euclidean distance of the region k and the region i in an L*a*b color space, $P_i$ represents a proportion of the region i to an image region; $W_s(r_k)$ is defined as follows:

$$W_s(r_k) = e^{-\frac{D_o(r_k, r_i)}{\sigma^2}} \tag{2}$$

wherein $D_o(r_k, r_i)$ represents a coordinate position distance of the region k and the region i, and $\sigma$ is a parameter controlling the range of the $W_s(r_k)$.

Step 12, by means of the color saliency value calculating mode, calculating a depth saliency value $S_d(r_k)$ of the depth image through the formula (3):

$$S_d(r_k) = \sum_{i=1, i\neq k}^{K} P_i W_s(r_k) D_d(r_k, r_i) \qquad (3)$$

wherein $D_d(r_k, r_i)$ represents a Euclidean distance of the region k and the region i in a depth space. Step 13, calculating a center and a depth weight $S_s(r_k)$ of the region k through the formula (4), wherein generally, a salient object is located in the center:

$$S_s(r_k) = \frac{G(\|P_k - P_o\|)}{N_k} W_d(d_k) \qquad (4)$$

wherein $G(\bullet)$ represents Gaussian normalization, $\|\bullet\|$ represents Euclidean distance operation, $P_k$ is a position coordinate of the region k, $P_o$ is a coordinate center of the image, and $N_k$ is the number of pixels of the region k. $W_d(d_k)$ is a depth weight, defined as follows:

$$W_d(d_k) = (\max\{d\} - d_k)^\mu \qquad (5)$$

wherein $\max\{d\}$ represents a maximum depth of the depth image, $d_k$ represents a depth value of the region k, and u is a parameter related to the calculated depth image, defined as follows:

$$\mu = \frac{1}{\max\{d\} - \min\{d\}} \qquad (6)$$

wherein $\min\{d\}$ represents a minimum depth of the depth image.

Step 14, obtaining a coarse saliency detection result $S_{fc}(r_k)$ by means of the formula (7), which is a non-optimized preliminary saliency detection result at the first processing phase:

$$S_{fc}(r_k) = G(S_c(r_k)S_s(r_k) + S_d(r_k)S_s(r_k)) \qquad (7)$$

Step 15, in order to optimize the preliminary saliency detection result, enhancing the result of the formula (7) by means of the depth image $I_d(d_k)$ and the image $C_b$ with the four background corners removed at the preprocessing phase, as shown in the formula 8:

$$S_1(r_k) = s_{fc}(r_k) \times \neg I_d(d_k) \times c_b \qquad (8)$$

$S_1(r_k)$ represents an optimized result of the $S_{fc}(r_k)$ of the formula 7, namely an optimized detection result at the first processing phase;

3) A second processing phase: converting the depth image into a color image, and obtaining a medium saliency detection result, defined as $S_2$, by means of the calculating process of the first processing phase and optimization of the back-propagation mechanism.

3) A third processing phase: carrying out background filtering on the depth image, converting the filtered depth image into a color image, and obtaining a final saliency detection result S by means of the calculating process of the second processing phase and optimization of the back-propagation mechanism.

Compared with the prior art, the present invention has the beneficial effects that:

the present invention provides the multi-layer back-propagation saliency detection algorithm based on depth image mining, including: firstly, at a preprocessing phase, obtaining the depth image of the image and the image with four background corners removed; secondly, calculating the preliminary saliency detection result based on information such as the color, the space and the depth of the image by means of the saliency detection algorism of the first layer; then carrying out deep mining on the depth image from the second layer and the third layer, and carrying out saliency detection by means of the calculating mode of the first layer; and finally, optimizing the saliency detection results of the second and third layers by means of the back-propagation mechanism to obtain the secondary saliency detection result image and the final saliency detection result image.

The present invention can detect the salient object more accurately and robustly. Compared with the prior art, the present invention has the following technical advantages:

(I) by multi-layer mining of the depth image, the present invention can improve the accuracy of salient object detection; and (II) the present invention provides the back-propagation mechanism to optimize the saliency detection result of each layer.

DETAILED DESCRIPTION OF THE INVENTION

The present invention is further described below through embodiments in combination with drawings, but the scope of the present invention will not be limited in any mode.

Figure 1:
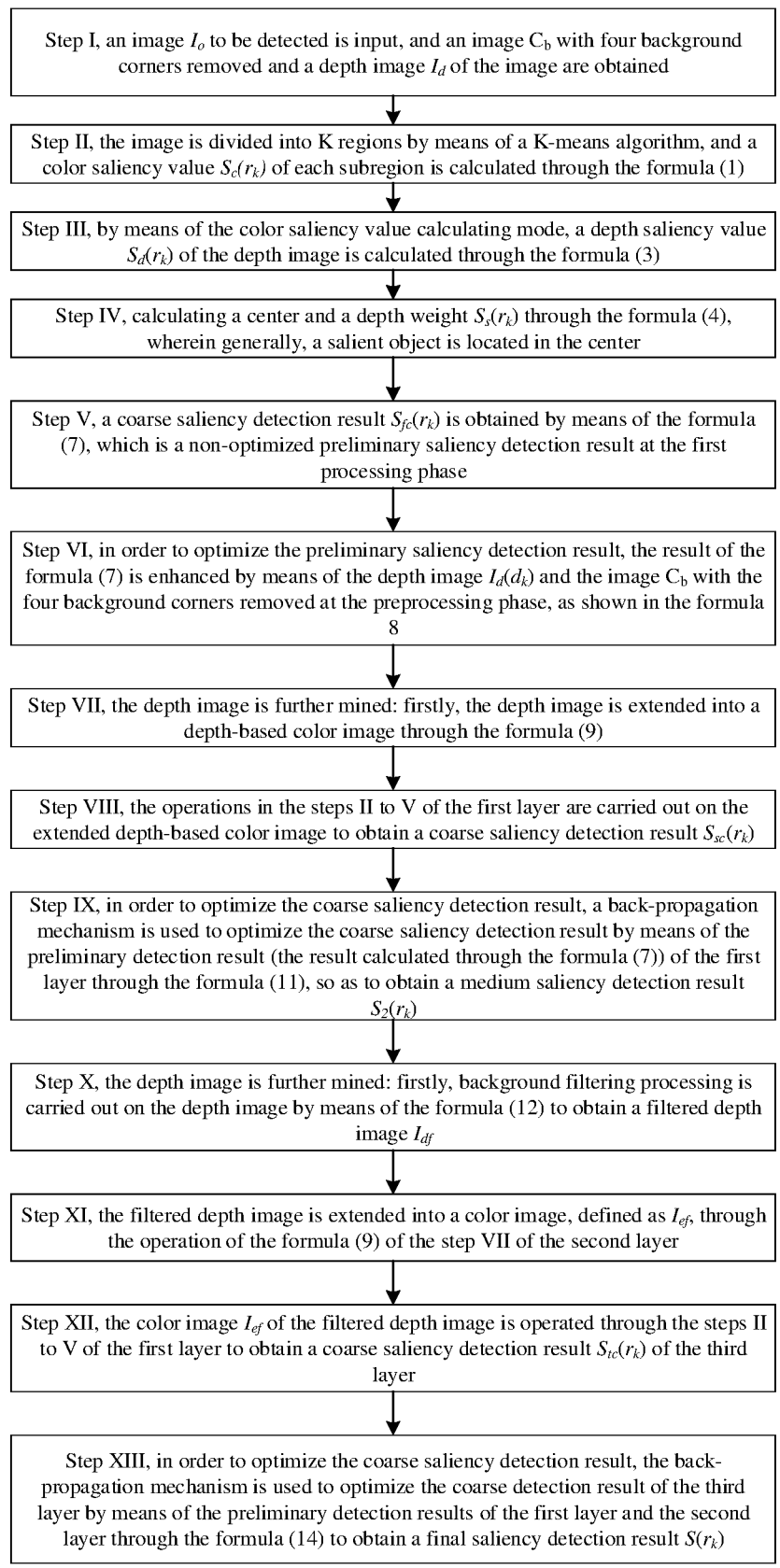
FIG. 1 shows a flowchart provided by the present invention.

The present invention provides a multi-layer back-propagation saliency detection algorithm based on depth image mining, which can detect a salient object more accurately and robustly. In the present invention, firstly, at a preprocessing layer/phase, a depth image of an image and an image with four background corners removed are obtained; secondly, at a first layer, second layer and third layer, the depth image is mined respectively to obtain corresponding saliency detection results; and finally, a back-propagation mechanism is used to optimize the saliency detection results of the various layers/processing phases to obtain a final saliency detection result image. FIG. 1 is a flowchart of a salient object detection method provided by the present invention, including the following steps that:

Step I, an image $I_o$ to be detected is input, and an image $C_b$ with four background corners removed and a depth image $I_d$ of the image are obtained;

wherein the image $C_b$ with four background corners removed is obtained by means of a BSCA algorithm recorded in the document (Qin Y, Lu H, Xu Y, et al. Saliency detection via Celluar Automata [C]/IEEE Conference on Computer Vision and Pattern Recognition. IEEE, 2015:110-119, and the depth image $I_d$ of the image is obtained by means of Kinect equipment;

first layer of operation of the algorithm: (Steps II to VI)

Step II, the image is divided into K regions by means of a K-means algorithm, and a color saliency value $S_c(r_k)$ of each subregion is calculated through the formula (1):

$$S_c(r_k)=\Sigma_{i=1,i\neq k}^{K} P_i W_s(r_k) D_c(r_k,r_i) \qquad (1)$$

wherein $r_k$ and $r_i$ respectively represent regions k and i, $D_c(r_k, r_i)$ represents a Euclidean distance of the region k and the region i in an L*a*b color space, $P_i$ represents a proportion of the region i to an image region; $W_s(r_k)$ is defined as follows:

$$W_s(r_k) = e^{-\frac{D_o(r_k,r_i)}{\sigma^2}} \qquad (2)$$

wherein $D_o(r_k, r_i)$ represents a coordinate position distance of the region k and the region i, and $\sigma$ is a parameter controlling the range of the $W_s(r_k)$;

Step III, by means of the color saliency value calculating mode, a depth saliency value $S_d(r_k)$ of the depth image is calculated through the formula (3):

$$S_d(r_k) = \sum_{i=1,i\neq k}^{K} P_i W_s(r_k) D_d(r_k, r_i) \qquad (3)$$

wherein $D_d(r_k, r_i)$ represents a Euclidean distance of the region k and the region i in a depth space. Step IV, calculating a center and a depth weight $S_s(r_k)$ through the formula (4), wherein generally, a salient object is located in the center:

$$S_s(r_k) = \frac{G(\|P_k - P_o\|)}{N_k} W_d(d_k) \qquad (4)$$

wherein $G(\cdot)$ represents Gaussian normalization, $\|\cdot\|$ represents Euclidean distance operation, $P_k$ is a position coordinate of the region k, $P_o$ is a coordinate center of the image, and $N_k$ is the number of pixels of the region k. $W_d(d_k)$ is a depth weight, defined as follows:

$$W_d(d_k)=(\max\{d\}-d_k)^\mu \qquad (5)$$

wherein $\max\{d\}$ represents a maximum depth of the depth image, $d_k$ represents a depth value of the region k, and u is a parameter related to the calculated depth image, defined as follows:

$$\mu = \frac{1}{\max\{d\} - \min\{d\}} \qquad (6)$$

wherein $\min\{d\}$ represents a minimum depth of the depth image;

Step V, a coarse saliency detection result $S_{fc}(r_k)$ is obtained by means of the formula (7), which is a non-optimized preliminary saliency detection result at the first processing phase:

$$S_{fc}(r_k)=G(S_c(r_k)S_s(r_k)+S_d(r_k)S_s(r_k)) \qquad (7)$$

Step VI, in order to optimize the preliminary saliency detection result, the result of the formula (7) is enhanced by means of the depth image $I_d(d_k)$ and the image $C_b$ with the four background corners removed at the preprocessing phase, as shown in the formula 8:

$$S_1(r_k)=s_{fc}(r_k)\times\neg I_d(d_k)\times c_b \qquad (8)$$

$S_1(r_k)$ represents an optimized result of the $S_{fc}(r_k)$ of the formula 7, namely an optimized detection result at the first processing phase;

second layer of operation of the algorithm: (Steps VII to IX)

Step VII, the depth image is further mined: firstly, the depth image is extended into a depth-based color image through the formula (9):

$$I_e\{R|G|B\} =I_o\{R|G|B\}\times I_d \qquad (9)$$

wherein $I_e$ is the extended depth-based color image;

Step VIII, the operations in the steps II to V of the first layer are carried out on the extended depth-based color image to obtain a coarse saliency detection result $S_{sc}(r_k)$:

$$S_{sc}(r_k)=G(S_c(r_k)S_s(r_k)+S_d(r_k)S_s(r_k)), \qquad (10)$$

Step IX, in order to optimize the coarse saliency detection result, a back-propagation mechanism is used to optimize the coarse saliency detection result by means of the preliminary detection result (the result calculated through the formula (7)) of the first layer through the formula (11), so as to obtain a medium saliency detection result $S_2(r_k)$:

$$S_2(r_k)=S_1^2(r_k)(1-e^{-S_{sc}^2(r_k)\cdot I_d(r_k)}) \qquad (11)$$

third layer of operation of the algorithm: (Steps X to XIII)

Step X, the depth image is further mined: firstly, background filtering processing is carried out on the depth image by means of the formula (12) to obtain a filtered depth image $I_{df}$:

$$I_{df} = \begin{cases} I_d, & d \leq \beta\times\max\{d\} \\ 0, & d > \beta\times\max\{d\} \end{cases} \qquad (12)$$

wherein $I_{df}$ is the depth image with the background filtered;

Step XI, the filtered depth image is extended into a color image, defined as $I_ef$, through the operation of the formula (9) of the step VII of the second layer;

Step XII, the color image $I_{ef}$ of the filtered depth image is operated through the steps II to V of the first layer to obtain a coarse saliency detection result $S_{tc}(r_k)$ of the third layer:

$$S_{tc}(r_k)=G(S_c(r_k)S_s(r_k)+S_d(r_k)S_s(r_k)) \qquad (13)$$

Step VIII, in order to optimize the coarse saliency detection result, the back-propagation mechanism is used to optimize the coarse detection result of the third layer by means of the preliminary detection results of the first layer and the second layer through the formula (14) to obtain a final saliency detection result $S(r_k)$:

$$S(r_k)=S_2(r_k)(S_2(r_k)+S_{tc}(r_k))(S_{tc}(r_k)+1-e^{-S_{tc}^2(r_k)S_k(r_k)}) \qquad (14)$$

Figure 2:
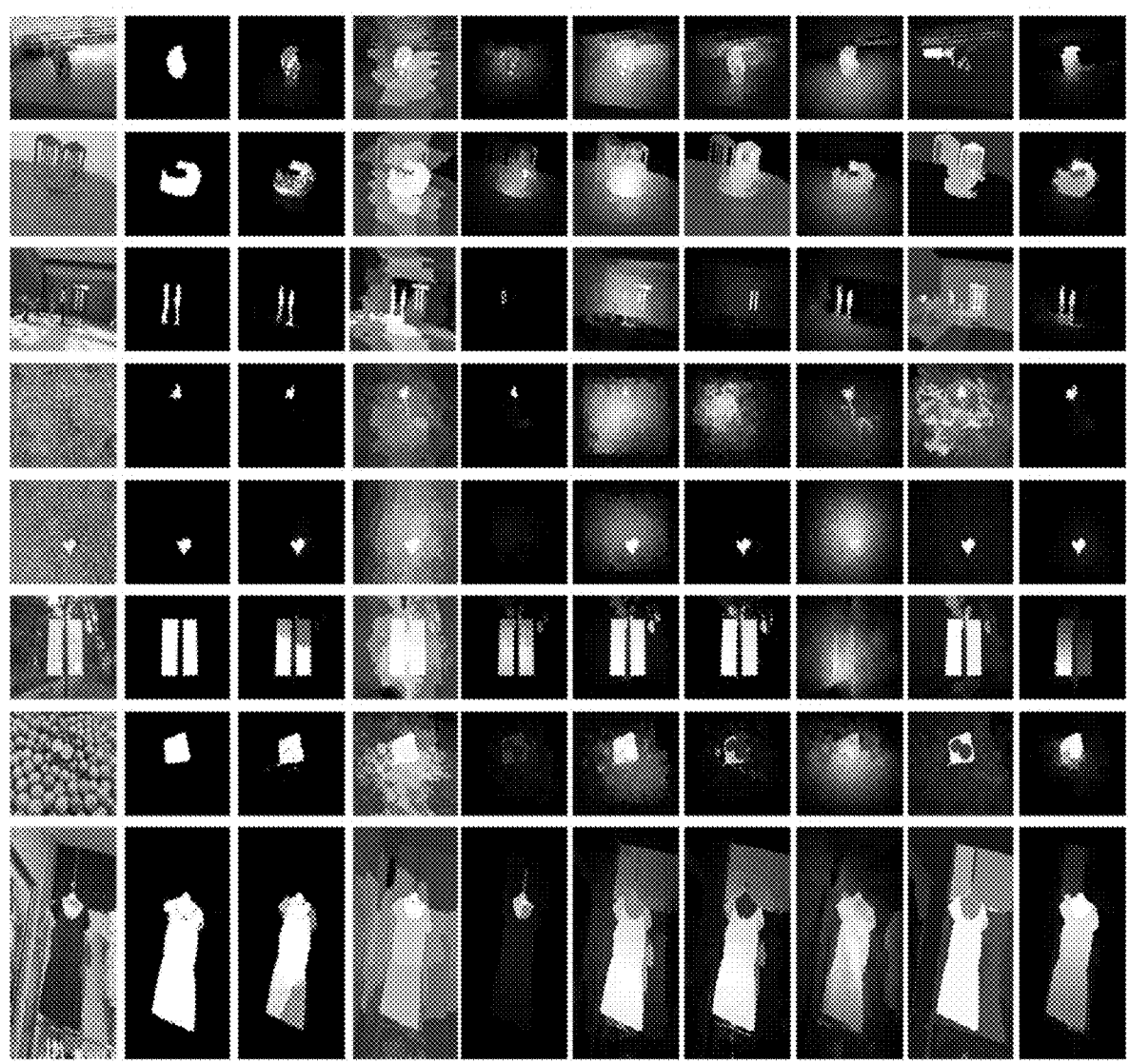
FIG. 2 shows a comparison diagram of detection result images, obtained by detecting an input image by respectively adopting an existing method and the method of the present invention, and images expected to be obtained via artificial calibration according to an embodiment of the present invention, wherein the first column displays the input images; the second column displays the images expected to be obtained via the artificial calibration; the third column displays the detection result images of the present invention; and the columns from four to ten are detection result images obtained by means of other existing methods.

FIG. 2 shows detection result images, obtained by detecting an input image by respectively adopting an existing method and the method of the present invention, and images expected to be obtained via artificial calibration, wherein the first column displays the input images; the second column displays the images expected to be obtained via the artificial calibration; the third column displays the detection result images of the present invention; and the columns from four to ten are detection result images obtained by means of other existing methods. Through comparison with the images of FIG. 2, it can be seen that compared with other methods, the method of the present invention can detect the salient object, is lowest in error rate and highest in accuracy and has extremely good robustness.

It should be noted that the embodiments are disclosed to help to further understand the present invention, but those skilled in the art can understand that various replacements and modifications are possible without departing from the spirit and scope of the present invention and attached clamps. Therefore, the present invention should not be limited to the contents disclosed by the embodiments. The protection scope of the present invention is based on the scope defined by claims.

The invention claimed is:

1. A back-propagation saliency detection method based on depth image mining, comprising, for an input image $I_o$:
   at a preprocessing phase, obtaining a depth image $I_d$ of an image $I_o$ and an image $C_b$ with four background corners removed;
   at a first processing phase, carrying out positioning detection on a salient region of the image by means of the obtained image $C_b$ with four background corners removed and the depth image $I_d$ to obtain a preliminary detection result of a salient object in the image, comprising steps 11-14;
   Step 11, dividing the image into K regions by means of a K-means algorithm, and calculating a color saliency value $S_c(r_k)$ of each subregion through the formula (1):

$$S_c(r_k) = \sum_{i=1, i \ne k}^{K} P_i W_s(r_k) D_c(r_k, r_i) \qquad (1)$$

wherein $r_k$ and $r_i$ respectively represent regions k and i, $D_c(r_k, r_i)$ represents a Euclidean distance of the region k and the region i in an L*a*b color space, $P_i$ represents a proportion of the region i to an image region; $W_s(r_k)$ is obtained through the formula (2):

$$W_s(r_k) = e^{-\frac{D_o(r_k, r_i)}{\sigma^2}} \qquad (2)$$

wherein $D_o(r_k, r_i)$ represents a coordinate position distance of the region k and the region i, and $\sigma$ is a parameter controlling the range of the $W_s(r_k)$;
Step 12, calculating a depth saliency value $S_d(r_k)$ of the depth image through the formula (3):

$$S_d(r_k) = \sum_{i=1, i \ne k}^{K} P_i W_s(r_k) D_d(r_k, r_i) \qquad (3)$$

wherein $D_d(r_k, r_i)$ represents a Euclidean distance of the region k and the region i in a depth space;
Step 13, calculating a center and a depth weight $S_s(r_k)$ of the region k through the formula (4):

$$S_s(r_k) = \frac{G(\|P_k - P_o\|)}{N_k} W_d(d_k) \qquad (4)$$

wherein $G(\cdot)$ represents Gaussian normalization, $\|\cdot\|$ represents Euclidean distance operation, $P_k$ is a position coordinate of the region k, $P_o$ is a coordinate center of the image, and $N_k$ is the number of pixels of the region k; $W_d(d_k)$ is a depth weight, calculated through the formula (5):

$$w_d(d_k) = (\max\{d\} - d_k)^\mu \qquad (5)$$

wherein $\max\{d\}$ represents a maximum depth of the depth image, $d_k$ represents a depth value of the region k, and $\mu$ is a parameter related to the calculated depth image, calculated through the formula (6):

$$\mu = \frac{1}{\max\{d\} - \min\{d\}} \qquad (6)$$

wherein $\min\{d\}$ represents a minimum depth of the depth image;
Step 14, obtaining a coarse saliency detection result $S_{fc}(r_k)$ by means of the formula (7):

$$S_{fc}(r_k) = G(S_c(r_k)S_s(r_k) + S_d(r_k)S_s(r_k)) \qquad (7)$$

wherein the saliency detection result $S_{fc}(r_k)$ is a preliminary saliency detection result obtained at the first processing phase;
then carrying out deep mining on the depth image $I_d$ from a plurality of processing phases to obtain corresponding saliency detection results; and the step of carrying out deep mining on the depth image $I_d$ from a plurality of processing phases comprises a second processing phase and a third processing phase;
processing at the second processing phase comprises steps 21 to 23:
Step 21, extending the depth image $I_d$ into a depth-based color image $I_e$ through the formula (9):

$$I_e\{R|G|B\} = I_o\{R|G|B\} \times I_d \qquad (9)$$

wherein $I_e$ is the extended depth-based color image;
Step 22, using the method of carrying out positioning detection on a salient region of the image at the first processing phase for the extended depth-based color image $I_e$ to obtain a coarse saliency detection result $S_{sc}(r_k)$ at the second processing phase, expressed as the formula (10):

$$S_{sc}(r_k) = G(S_c(r_k)S_s + S_d(r_k)S_s(r_k)), \qquad (10)$$

Step 23, using a back-propagation mechanism to optimize the coarse saliency detection result of the second processing phase in step 22 by means of the preliminary detection result of the first processing phase, so as to obtain a medium saliency detection result $S_2(r_k)$ through the formula (11):

$$S_2(r_k) = S_1^2(r_k) + S_1(r_k)\left(1 - e^{-S_{sc}^2(rk) - I_d(rk)}\right); \qquad (11)$$

processing at the third processing phase comprises steps 31 to 34:
Step 31, further mining the depth image: firstly, carrying out background filtering processing on the depth image by means of the formula (12) to obtain a filtered depth image $I_{df}$:

$$I_{df} = \begin{cases} I_d, & d \le \beta \times \max\{d\} \\ 0, & d > \beta \times \max\{d\} \end{cases} \qquad (12)$$

wherein $I_{df}$ is the depth image with the background filtered;

Step 32, extending the filtered depth image into a color image through the formula (9), defined as $I_{ef}$;

Step 33, using the method of carrying out positioning detection on a salient region of the image at the first processing phase for the color image $I_{ef}$ of the filtered depth image to obtain a coarse saliency detection result $S_{tc}(r_k)$ of the third processing phase, expressed as the formula (13):

$$S_{tc}(r_k)=G(S_c(r_k)S_s(r_k)+S_d(r_k)S_s(r_k)) \quad (13);$$

Step 34, using the back-propagation mechanism to optimize the coarse detection result of the third processing phase by means of the preliminary detection results of the first processing phase and the second processing phase to obtain a saliency detection result $S(r_k)$ through the formula (14):

$$S(r_k) = S_2(r_k)(S_2(r_k) + S_{tc}(r_k))\left(S_{tc}(r_k) + 1 - e^{-S_{tc}^2(r_k)S_1(r_k)}\right) \quad (14)$$

thus, a final saliency detection result image is obtained.

2. The back-propagation saliency detection method based on depth image mining of claim 1, wherein the depth image $I_d$ is specifically obtained by means of Kinect equipment.

* * * * *